Aug. 29, 1967 K. L. AGNEW 3,338,766

RECORDING AND REPRODUCING THE SHAPE OF THREE-DIMENSIONAL OBJECTS BY CONTOUR LINES

Filed July 22, 1964 3 Sheets-Sheet 1

INVENTOR
K. L. AGNEW

INVENTOR
K. L. AGNEW

United States Patent Office 3,338,766
Patented Aug. 29, 1967

3,338,766

RECORDING AND REPRODUCING THE SHAPE OF THREE-DIMENSIONAL OBJECTS BY CONTOUR LINES

Kenneth Leslie Agnew, Falconbridge, Ontario, Canada

Filed July 22, 1964, Ser. No. 385,554
4 Claims. (Cl. 156—58)

This document is a continuing application containing, in part, material from an application for Letters Patent filed June 5, 1963, Ser. No. 285,669, now abandoned.

This invention relates to a method of recording and reproducing the shape of three-dimensional objects by means of contour lines produced by substantially parallel rays of light projected on the object, at an angle between the line connecting the object and its two-dimensional image, or images, and the plane, or planes, normal thereto, and to the subsequent reproduction in three dimensions of the object by following these contour lines with a stylus or other tracing device free to move normal to the ersulting plane of an image, and attached to a cutting or forming tool which is fed at the same angle with reference to the material being shaped as the original rays of light were projected.

In this method the contour lines are formed by light rays projected at the most advantageous angle to delineate the object, and may be imaged in one or more views, so that if not clearly seen and separated due to the angle of observation in one view, they may be seen clearly in another view. Any or all of the views may be used in reproduction by orienting the material being shaped, and the cutting or forming tool, so that the tool is fed at the same relative angle to the material being shaped as the original light rays were to the shape to be reproduced, while the tracing device is following a contour line on the image.

In my prior United States application for Letters Patent, Ser. No. 33,682, filed June 3, 1960, now Patent No. 3,085,923, I have described and claimed a method of recording and reproducing three-dimensional shapes. The process described in my prior application claimed the projection of images of multiple lines on to the object by light rays whose paths are at a substantial angle to both the line, or lines, joining object and image, or images, and to the plane, or planes, to which the line, or lines, joining object and image, or images, are perpendicular, said lines being projected as groups along parallel rays, to form contour lines superimposed on an image of the object.

The projection of multiple lines, for precision reproduction, implies a very small or non-existent spacing between the lines, and while the leading edge of the blanket gradually covering the object when lines are projected successively, or a broadened line advanced incrementally to form the contour lines, may be traced electronically, as well as manually, it is sometimes preferable that the lines be distinctly separated in the recording, yet that the contours cut or formed be very closely spaced, adjoining, or even overlapping, and that in some instances a particular point on a line be marked to bring into operation an additional operation, such as drilling, or instruction as to speed of milling.

The disabilities, for automatic operation, inherent in my prior application, may be obviated by projecting a line along the desired ray, recording the resulting contour line; projecting another line along a ray substantially parallel to the first projected ray, and recording this; and continuing in this fashion. Between these individual projections, the recording film may be moved a standard distance so that the record of each contour line is well separated and distinct from the others. Also, the recorded line may be traced and erased, before projection of subsequent lines. In some cases, especially with large objects, it may be preferable to project a moving spot of light along the ray, to trace a line, and record the contour line produced by this spot of light, this being only a particular case of line projection. In the same way, subsequent contour lines may be produced by moving the spot of light along parallel sheets.

The present invention will be more fully understood from the following description, taken in connection with the attached drawings, in which.

Figure 1:
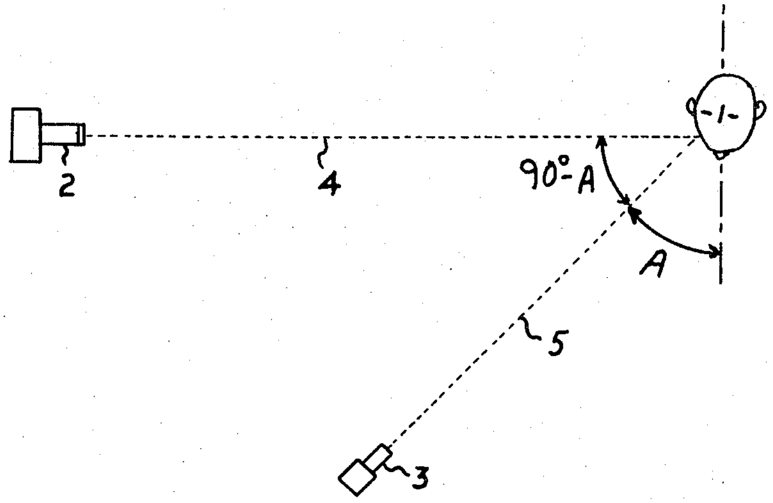
FIGURE 1 is a diagrammatic plan of an arrangement used to obtain the contour lines.
Figure 2:
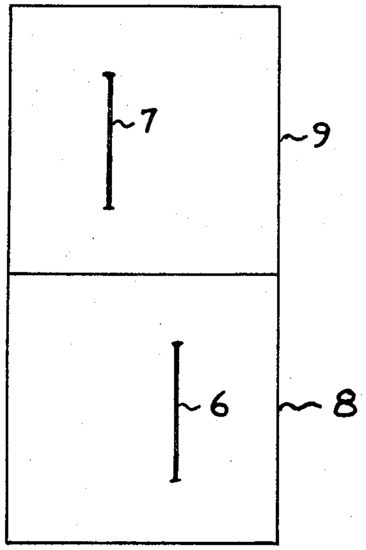
FIGURE 2 is a view of two lines to be projected successively.

Referring first to FIGURE 1, 1 indicates the object, a portion of whose shape is to be reproduced. 2 is a camera by which a photograph of the direct view of the object may be taken. 4 is a straight line joining the object and the direct image, and the planes normal to this directional line, and its extension, appear as datum planes throughout, being the plane of the two-dimensional record, or a plane parallel to it. 5 is a straight line joining the projector 3 and the object 1. 3 is a projector which throws a line, such as is shown in FIGURE 2, to strike the object, the line joining object and projector being, in this illustration, at 45° to the line joining camera and object.

Figures 3, 4, 5, 6, 7, 8:
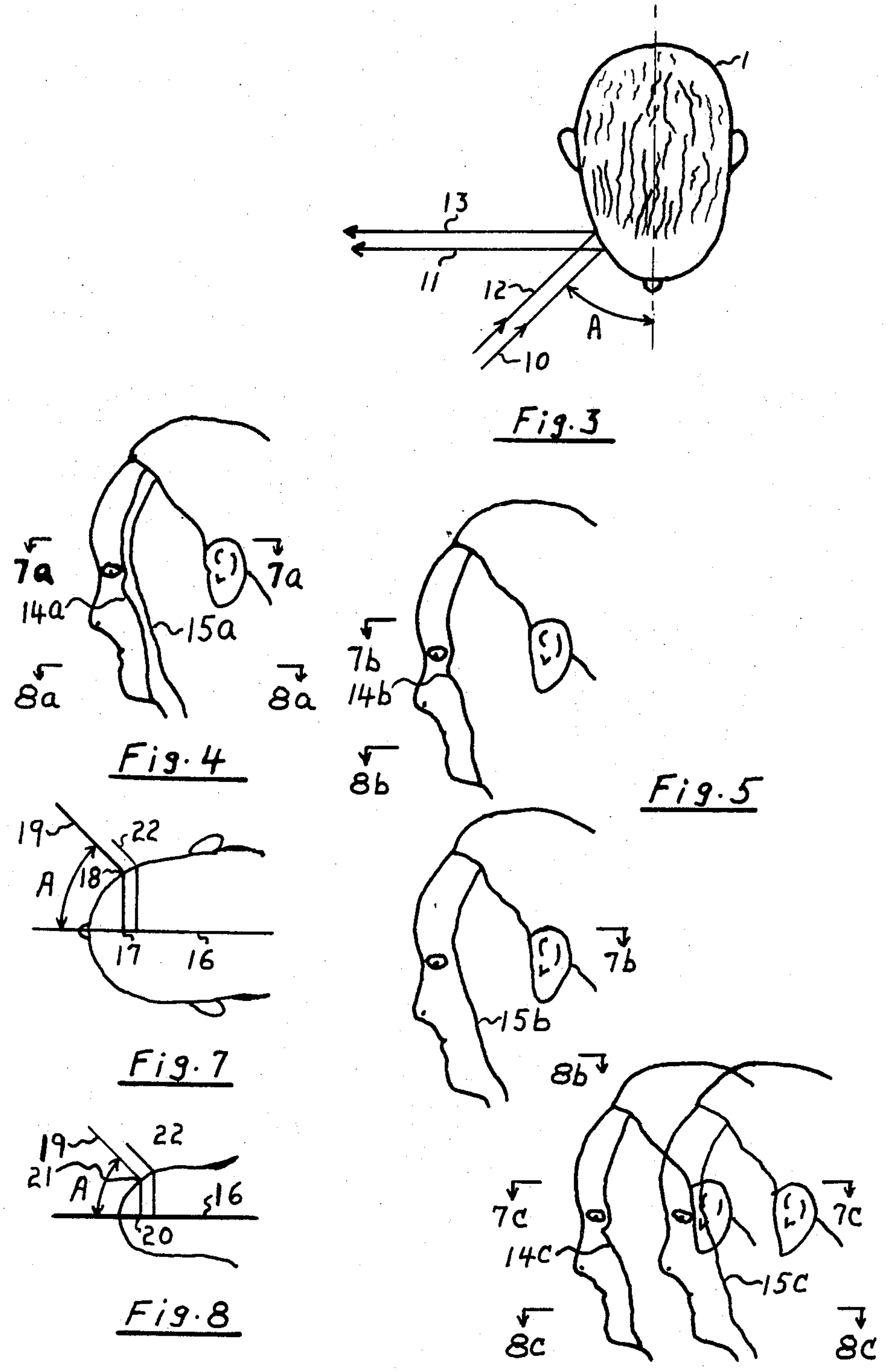
FIGURE 3 is an enlarged view of a portion of FIGURE 1, indicating the path of light rays to and from the object whose shape is to be reproduced.
FIGURE 4 is a representation of the object with a record of two contour lines superimposed, after reversal.
FIGURE 5 shows two representations of the object with a record of a contour line superimposed on each, after reversal.
FIGURE 6 shows two representations of the object, partly superimposed, with a record of a contour line superimposed on each, after reversal.
FIGURE 7 is a section of the image indicated by the line 7—7 on FIGURES 4, 5, or 6, showing points produced by the light rays, and recorded, as they would be reprojected, after adjustment back to the original relative spacing of the parallel rays along which they were projected in the cases of FIGURES 5 and 6, with the outline of the shape reproduced at this section.
FIGURE 8 is a section of the image indicated by the line 8—8 on FIGURES 4, 5 or 6, showing points produced by the light rays, and recorded, as they would be reprojected, after adjustment back to the original relative spacing of the parallel rays along which they were projected, in the cases of FIGURES 5 and 6, with the outline of the shape reproduced at this section.

10, 11, 12 and 13, FIGURE 3, indicate the paths of two light rays from the projector 3, as reflected from the object to the camera, and, in this illustration, it is assumed that line 6, frame 8, of FIGURE 2 is projected first by projector 3, FIGURE 1, along the plane 10, FIGURE 3, to be reflected along path 11 to produce contour line 14*a*, FIGURE 4; 14*b*, FIGURE 5; or 14*c*, FIGURE 6. Line 7, frame 9, of FIGURE 2 is then projected by projector 3 along the plane 12 to be reflected along path 13 to produce contour line 15*a*, FIGURE 4; 15*b*, FIG- URE 5; or 15c, FIGURE 6. In the illustration outlined by FIGURE 5, the recording device in camera 2, FIGURE 1, is shifted vertically, between projections, to separate the two contour lines 14b and 15b. In the illustration outlined by FIGURE 6, the recording device in camera 2, FIGURE 1, is shifted horizontally, between projections, to separate the two contour lines 14c and 15c. FIGURE 4 illustrates a recording of the two successive projections to produce corresponding contour lines 14a and 15a without displacement. Intermediate angular displacements are also possible. It is also possible to record each contour line on a screen, trace it, as described below, erase, and then project subsequent contour lines; or a group of widely separated lines may be projected along substantially parallel sheets, traced and erased, or the film moved, prior to the projection of another group of widely separated lines along sheets parallel with, and generally interstitial to, the previous sheets.

Lines 6 and 7 are shown in FIGURE 2 as occupying separate frames, for the sake of clarity, and this might be preferable where instructions were incorporated in the line for automatic operation, but, in practice, a single line shifted horizontally between projections, is usually more convenient.

The successive lines are projected, in any one view, along sheets substantially parallel to each other, which, in the case of large objects, normally involves the use of a long-focus lens, or one which may be moved in a plane normal to its axis. The recording device will also, normally, have a long-focus lens, to avoid distortion.

Where the contour lines are displaced between recordings, as in FIGURES 5 and 6, they must be returned to register, as in FIGURE 4, while cutting or forming the three-dimensional shape, as described below.

Referring to FIGURE 7, 16 is a print made from the negative (negative, print and record may be used as interchangeable terms in this specification), FIGURE 4, and 17 is the point at which projected line 6, striking the object was imaged as contour line 14a at section 7a—7a, FIGURE 4.

Considering the print 16, FIGURE 7, as a reference plane, a point 17, corresponding in three dimensions to point 17 on the two-dimensional print, may be obtained by advancing a pointer, in the plane of the paper, along a plane 19, which is normal to the plane of the paper, and is, in this illustration, at the same angle A to the print as the original projected ray was to the plane normal to the line joining camera and object, as this plane lies in the plane of the print, until it is the required distance, measured with respect to a reference point, or by calculation, above the point 17 on print 16, FIGURE 7.

Using point 18 as the starting point and moving in plane 19 to maintain the pointer directly above the line 14a on which 17 is a point, it will be found that one outline of the shape of the original object has been traced. FIGURE 8 illustrates the situation when the pointer reaches the point of intersection with section 8a—8a, FIGURE 4, 20 representing the point of intersection on the print, and 21 the position of the pointer when it is above this point.

Referring now to FIGURE 2, the distance between the substantially parallel planes along which vertical lines 6 and 7 were projected may be measured or calculated, being the same as that between the originally projected lines in the case of a full-size record, or proportionately greater or smaller in the event of enlargement or diminution or reproduction. The pointer may then be moved from plane 19 to parallel plane 22, where by moving the pointer in plane 22 to maintain it vertically above the contour line 15a, which is an image of the projected line 7, another outline of the shape of the original object may be traced.

This process may be repeated until all the contour lines clearly distinguishable in this view are traced. Multiple views of the projected lines are possible, using more than one camera, or with the aid of mirrors. For complete coverage of objects, in the round, it will, of course, be necessary to project substantially parallel groups of lines from various angles.

Figure 9:
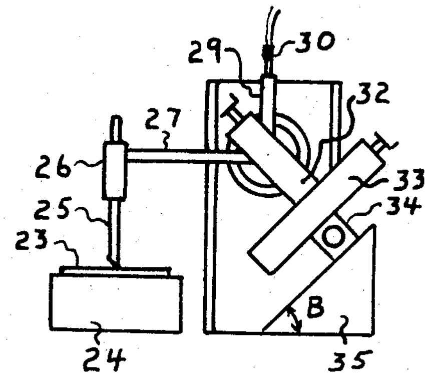
FIGURE 9 is a front elevational view of the apparatus used to reproduce the three-dimensional shape by means of the contour lines.
Figure 10:
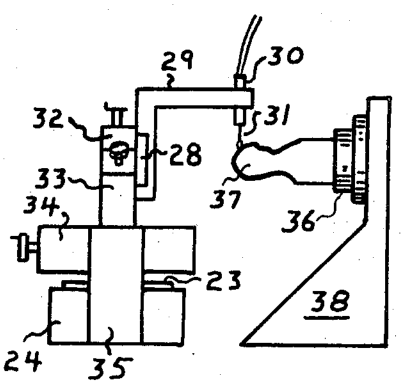
FIGURE 10 is a side view of the apparatus illustrated in FIGURE 9.

Considering now an apparatus by means of which the contour lines on a two-dimensional image may be used to reproduce the original shape in three dimensions, 23, FIGURES 9 and 10, is a photographic record, with contour lines as in FIGURES 4, 5 or 6, fastened to a support 24 and oriented as print 16, FIGURE 7. Where the contour lines were separated between projections, as in FIGURES 5 and 6, it will be necessary to bring the lines successively into register, as in FIGURE 4, before using them to guide the cutting or forming tool (the terms cutting or forming tool are used interchangeably to designate the device in physical contact with, and shaping, the material into three dimensions, or actuating an auxiliary device, which in turn may perform the actual cutting or forming operation, and this may include imprinting on magnetic and punched tapes). In my experiments, the outline of the shape being traced was visible to aid in adjustment originally, but this may be an automatic operation with standardized equipment. 25 is a tracing device moving freely up and down in support 26. Support 26 is attached rigidly by means of a bracket 27 to the base of a vise 28. Vise 28, FIGURE 10, holds a bracket 29, which supports a cutting or forming tool 30, with bit 31 which may be considered to be part of said tool. 32, 33 and 34 are feeding devices, at right angles to each other in this illustration, carrying the vise or tool holder 28, and with means for controlled and measurable adjustment, fastened to base 35. This base has, or may be adjusted to, such an angle B with the base plate, that the tool clamped via vise 28 is fed by feed 32 or 33, in conjunction with the horizontal feed 34, in a plane having the same angle with the image of the object in print 23, as the light ray originally producing the contour being followed bore to the object, as it was viewed in two dimensions. Alternatively, or additionally, the angle between feeds 32 and 33 may be adjustable, but this is not shown nor normally necessary. As indicated in FIGURE 9, feeds 32 and 33 are both adjustable in the plane of the paper, and feed 34 is adjustable normal thereto. Vise 36 is rotatable about its base and holds the material being shaped 37. 38 is the support for this vise, and may include means for adjusting the vise vertically or horizontally, to facilitate positioning of the material 37 to an index point. While 25 and 26, FIGURE 9, are shown as a simple tracing device and holder, this is not intended to preclude the use of more complex intervening mechanisms producing the angular relationship described; and the "rigid attachments" may be considered to include devices performing a function similar to the mechanical attachments, for instance, selsyn motors.

Figure 11:
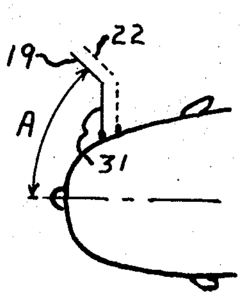
FIGURE 11 is a view of the material being shaped, with a cutting tool shown in two positions indicated by the contour lines in FIGURES 4 and 7.

Correlating FIGURE 7 with FIGURES 9 and 10, the bit 31 is adjusted to an index point on the material 37, and the tracing device 25, or negative 23, adjusted so that the pointer rests on the corresponding index point on the print, for instance, point 17, FIGURE 7. Feed 32, advancing and retracting in plane 19, in conjunction with feed 34 at right angles to it, may then be used to maintain the tracing device on contour line 14a, 14b, or 14c, which have identical shapes and positions, while the connected bit 31 is reproducing a corresponding outline in the material being worked 37. Feed 33 is then used to transfer bit 31 to plane 22, when contour line 15a, 15b, or 15c may be followed by tracing device 25. As described above, contour line 15b or 15c is adjusted to occupy the same position with relation to the path traced by the bit, FIGURE 11, as would the unadjusted contour line 15a.

By adjustment of the vise 36, or the angle B of support 35, and by using feeds 32 and 33 alternatively to adjust the movement of bit 31 along the contour lines or from one parallel plane to another, contour lines showing in views at various angles may be cut or formed, the plane in which the cutting or forming tool moves while the tracing device is following a contour line being, in each instance, at the same angle to the material being shaped as was the original projected ray of light to the object being viewed. By tracing all distinguishable lines, a three-dimensional reproduction of the original shape is thus formed in material 37, the precision of which will depend largely on the number of contour lines.

The sheets of light of projection, of course, must lie at a substantial angle to the plane containing projector, object and image, in order to produce contour lines.

In the above description, the edge of a shadow may be considered to be a contour line.

Having described the invention, what is claimed as new is:

1. A method for reproducing the shape of three-dimensional objects, comprising the steps of registering an image of the object, projecting the images of multiple lines on to the object by light rays whose planes of passage are at a substantial angle of both the lines joining object and image and to the planes to which the lines joining object and image are perpendicular, said groups of lines being projected along parallel rays, each line of the group projected, after the initial line, producing a reflected contour line which is recorded on a medium where it is displaced a known disproportionate distance from that position in which it would be normally recorded in relation to the preceding contour line, so that there is a distinct separation between lines recorded, followed by the steps of guiding a tracing device, said tracing device being inserted in a holding device in such a way that it is free to move only in a direction with respect to the holding device that is normal to the plane of the image of the contour lines, and said holding device being connected to a forming tool moving in a plane of motion having the same angle to the image, as it was viewed in two dimensions, as the plane of passage of the light ray had to the object, as it was viewed in two dimensions, and in such a way that both holding device and forming tool share the same motions in said plane of passage of the light ray, and also in a plane parallel to said plane, while a contour line is being traced, and thus reproducing an outline, then moving the forming tool to a parallel plane and re-spacing the tracing tool and the corresponding contour line the known distance back to the position it would have occupied with respect to the preceding line before the above-mentioned displacement, and so tracing successive lines, the sum of the outlines producing the reproduction of the view imaged, in three dimensions.

2. A method according to claim 1 in which, when the forming tool controls the input to a controller, which in turn controls a second forming tool, the re-spacing of the record of the contour lines is performed by the controlling device.

3. A method for reproducing the shape of three dimensional objects, comprising the steps of registering an image of the object, projecting the images of multiple lines on the object by light rays whose planes of passage are at a substantial angle to both the lines joining object and image and to the planes to which the lines joining object and image are perpendicular, said groups of lines being projected along parallel rays, each line of the group projected producing a reflected contour line which is utilized to guide a tracing device, said tracing device being inserted in a holding device in such a way that it is free to move only in a direction with respect to the holding device that is normal to the plane of the image of the contour lines, and said holding device being connected to a forming tool moving in a plane of motion having the same angle to the image, as it was viewed in two dimensions, as the plane of passage of the light ray had to the object, as it was viewed in two dimensions, and in such a way that both holding device and forming tool share the same motions in said plane of passage of the light ray, and also in a plane parallel to said plane, thus producing an outline; the recorded line being erased after tracing and another line of the group being then recorded, and the tracing device being moved to this line and the forming tool to the corresponding parallel plane, the sum of the outlines producing the reproduction of the shape in three dimensions.

4. A method according to claim 3 whereby multiple widely separated lines are projected along parallel planes and the resulting contour lines are recorded, utilized and erased; followed by subsequent projections of other groups of widely separated lines along planes parallel to the previous planes, to provide the desired coverage of the object whose shape is to be reproduced.

References Cited

UNITED STATES PATENTS

| | | | |
|---|---|---|---|
| 1,382,978 | 6/1921 | Hopkins | 156—58 |
| 1,546,636 | 7/1925 | Englemann | 156—58 |
| 2,085,400 | 6/1937 | Tomozawa | 156—58 |
| 2,335,127 | 11/1943 | Ling | 156—58 |
| 2,350,796 | 6/1944 | Morioka | 156—58 |
| 2,502,697 | 4/1950 | Blain | 156—58 |
| 2,891,339 | 6/1959 | Kao | 156—58 |
| 2,981,147 | 4/1961 | Carter et al. | 156—58 X |
| 3,085,923 | 4/1963 | Agnew | 156—58 |
| 3,185,602 | 5/1965 | Morioka | 156—58 |
| 3,195,411 | 7/1965 | MacDonald et al. | 156—58 X |

EARL M. BERGERT, *Primary Examiner.*

HAROLD ANSHER, *Examiner.*